(No Model.) 3 Sheets—Sheet 3.
C. E. HOLMES.
LAWN MOWER.
No. 425,794. Patented Apr. 15, 1890.
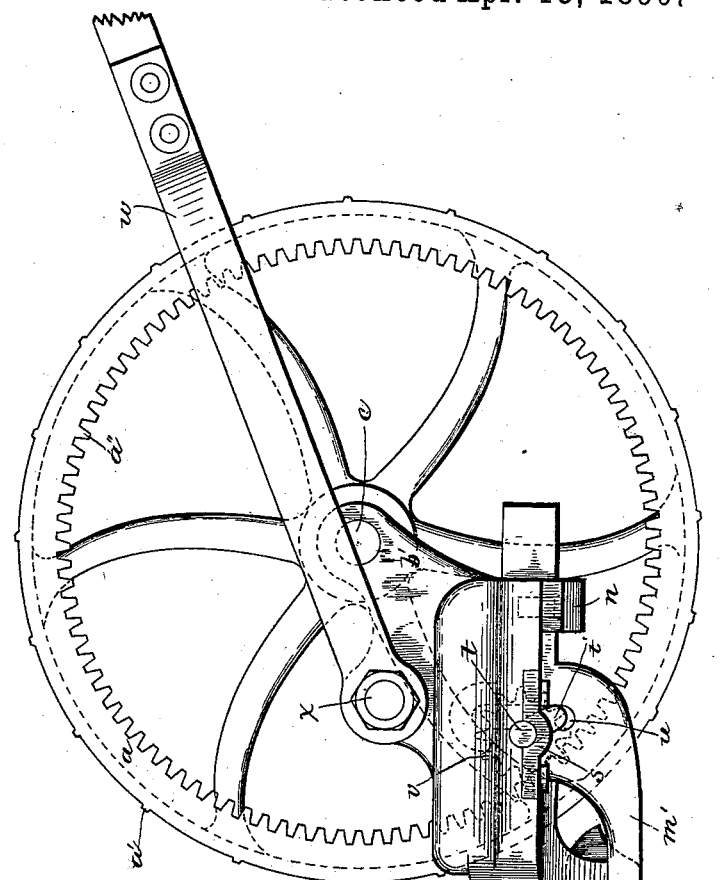
Fig. 3.
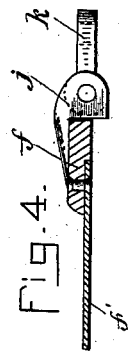
Fig. 4.
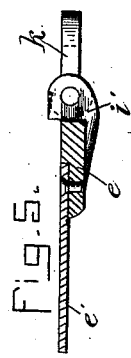
Fig. 5.
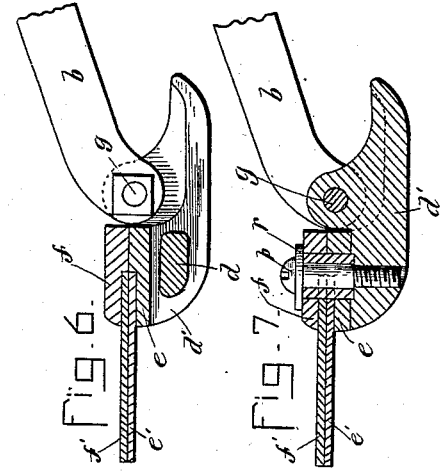
Fig. 6.  Fig. 7.
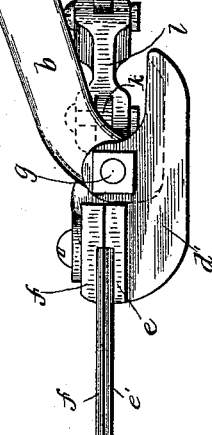
WITNESSES:
A. D. Harrison
W. C. Ramsay.
INVENTOR:
C. E. Holmes
by Wright Brown Crosby
Attys.

UNITED STATES PATENT OFFICE.

CHARLES E. HOLMES, OF HAVERHILL, ASSIGNOR OF ONE-HALF TO FREDERICK H. PAGE, OF NEWTONVILLE, MASSACHUSETTS.

LAWN-MOWER.

SPECIFICATION forming part of Letters Patent No. 425,794, dated April 15, 1890.

Application filed December 21, 1889. Serial No. 334,512. (No model.)

*To all whom it may concern:*

Be it known that I, CHARLES E. HOLMES, of Haverhill, in the county of Essex and State of Massachusetts, have invented certain new and useful Improvements in Lawn-Mowers, of which the following is a specification.

This invention has for its object to provide a mowing-machine particularly adapted to be operated by hand for lawn-mowing purposes, adapted to cut grass of any height, and to act close to fences, trees, and other obstructions.

The invention consists in the improved mowing-machine hereinafter described, comprising a main driving-wheel having an internal gear, cutting devices consisting of two cutter-bars supported by a hinged frame adapted to move upon the ground, a toggle-joint composed of two links, one of which is pivoted to one of the cutter-bars and the other to the other cutter-bar, and mechanism operated by the internal gear in the driving-wheel, whereby said toggle-links are moved, so as to simultaneously move the said cutter-bars in opposite directions.

The invention also consists in certain details and combinations, the parts of which I will now proceed to describe and claim.

Figure 1:
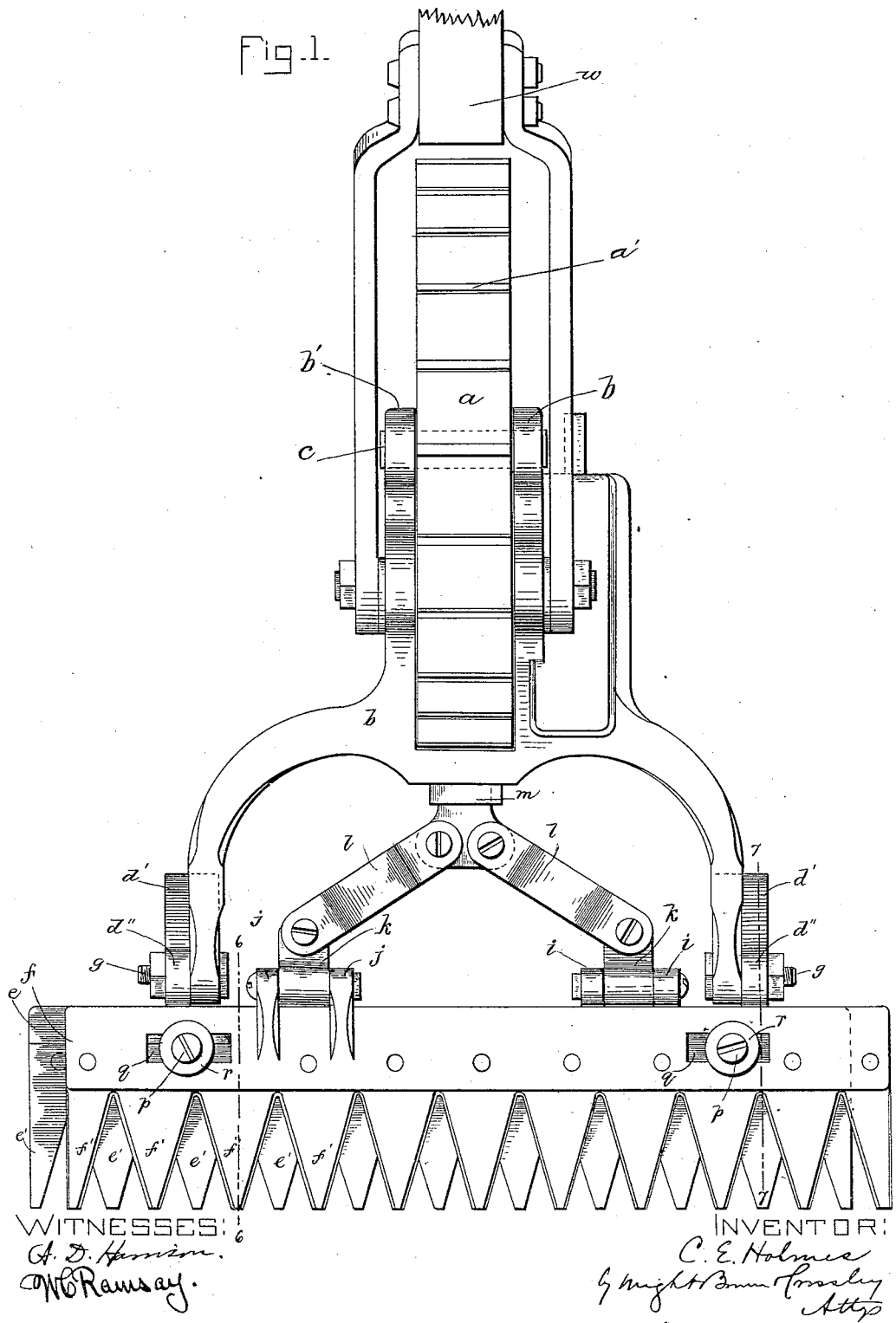
Figure 2:
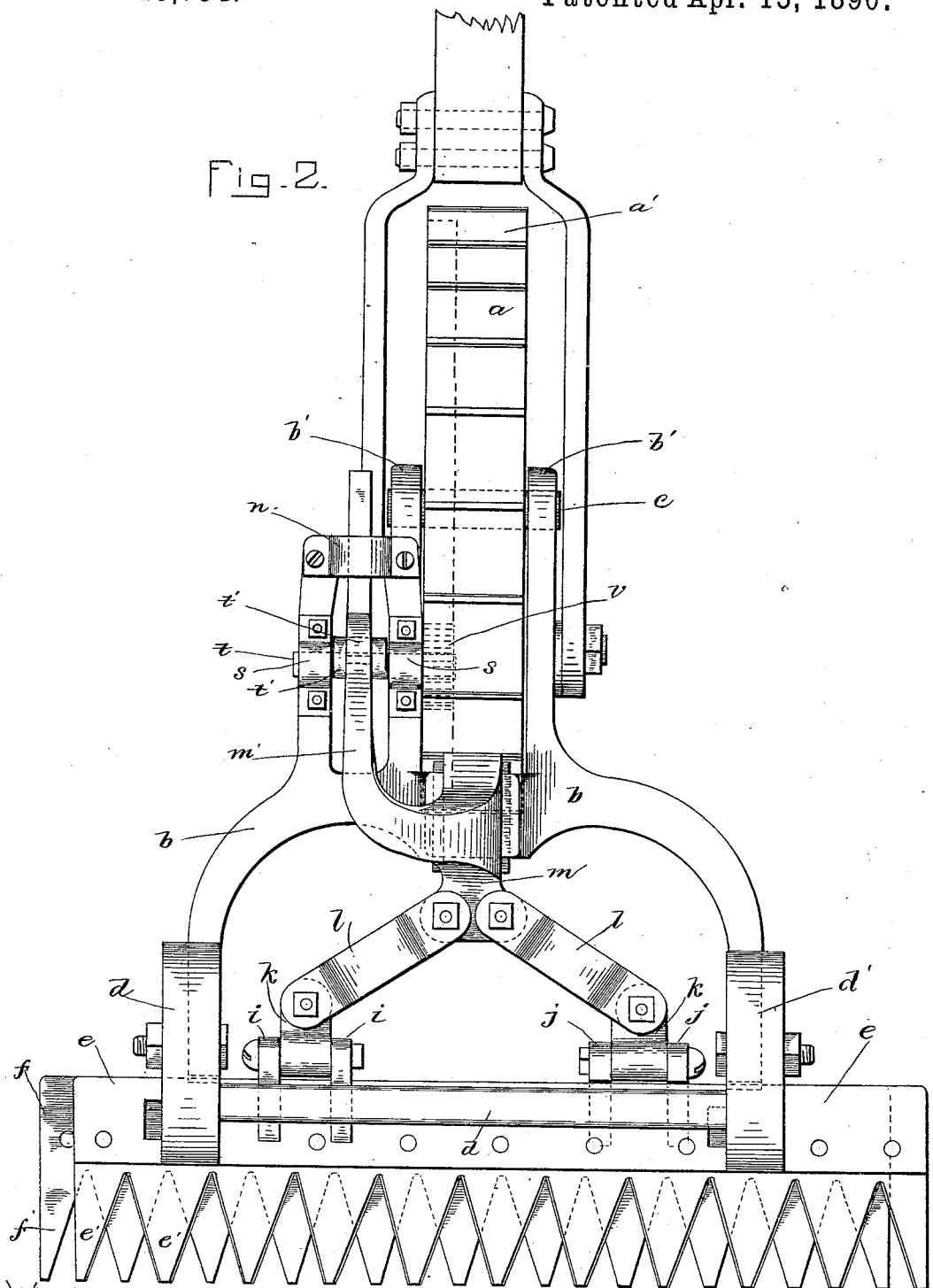

Of the accompanying drawings, forming a part of this specification, Figure 1 represents a top plan view of my improved mowing-machine. Fig. 2 represents a bottom plan view of the same, the machine being turned bottom up. Fig. 3 represents a side elevation. Fig. 4 represents a transverse section of the upper cutter-bar detached. Fig. 5 represents a transverse section of the under cutter-bar detached. Fig. 6 represents a section on line 6 6 of Fig. 1, looking toward the left. Fig. 7 represents a section on line 7 7 of Fig. 1, looking toward the left.

The same letters of reference indicate the same parts in all the figures.

In the drawings, $a$ represents the driving-wheel, which is provided on its periphery with suitable ribs or teeth $a'$, to give it a suitable frictional hold on the ground, and on its interior with gear-teeth $a''$, constituting an internal gear. The shaft $c$ of said wheel is journaled in bearings formed in ears $b'$ $b'$ of a yoke or frame $b$, which is forked or bifurcated, the forward ends of its bifurcations being connected by pivots $g$ $g$ with ears $d''$, formed on shoes or runners $d'$, which are adapted to slide upon the ground and are connected by a transverse bar $d$, Figs. 2 and 6.

$e$ designates the lower cutter-bar, to which are attached the V-shaped knives or cutters $e'$. Said cutter-bar rests upon seats formed to support it upon the upper sides of the shoes $d'$ $d'$, and is adapted to slide lengthwise upon said seats.

$f$ designates the upper cutter-bar, which is adapted to slide upon the lower cutter-bar $e$, and is provided with a series of V-shaped knives $e'$ or cutters $f'$, adapted to co-operate with the teeth $e'$ of the lower cutter-bar.

Studs or bolts $p$ $p$ are affixed to the shoes $d'$ $d'$, and, projecting upwardly therefrom, pass through slots $q$ $q$ in the cutter-bars $e$ $f$, said studs confining washers $r$ upon the upper surface of the cutter-bar $f$. The cutter-bars $e f$ are held in place and guided by the studs $p$ $p$ and washers $r$, the slots $q$ permitting the said cutter-bars to reciprocate upon said studs.

$i$ $i$ designate ears formed upon and projecting backwardly from the under cutter-bar $e$, and $j$ $j$ represent similar ears formed upon and projecting backwardly from the upper cutter-bar $f$. To said ears are pivoted lugs $k$ $k$, to which in turn are pivoted the toggle-links $l$ $l$. Said links are pivoted at their rear ends to a slide $m$, which is fitted to move in a guide formed for it in the frame or yoke $b$. The slide $m$ is provided with an arm $m'$, which projects rearwardly at one side of the driving-wheel $a$, and is adapted to slide in a guide $n$ on the frame or yoke $b$.

Journaled in bearings $s$ $s$ on the under side of the frame or yoke $b$ is a crank-shaft $t$, the wrist-pin $t'$ of which enters a slot $u$, formed in the arm $m'$. To one end of the shaft $t$ is affixed a pinion $v$, which meshes with the teeth $a''$, comprising the internal gear in the driving-wheel $a$.

The rotation of the wheel $a$ causes its internal gear to rotate the pinion $v$ on the crank-shaft $t$, the wrist-pin $t'$ of said shaft being thus caused to revolve and acting on the sides of the slot $u$ to reciprocate the arm $m'$ and slide $m$, said slide being reciprocated in a direction at right angles to the length of the cutter-bars. The described movement of the slide m causes the toggle-links l l to reciprocate the cutter-bars e f simultaneously in opposite directions, in a manner which will be readily understood, the links l l being alternately moved approximately into line with each other by a forward movement of the slide m and out of line with each other, as shown in Figs. 1 and 2, by a backward movement of said slide.

It will be seen that the described simultaneous reciprocation of both cutter-bars causes the cutters thereof to act rapidly in cutting grass, the action being much more rapid than that of a single cutter-bar the cutters of which operate in conjunction with a series of fixed guard-fingers. It will also be observed that when the device is used as a lawn-mower and propelled by a handle w, pivoted at x to the ears b', the cutters, being in advance of the driving-wheel, can be caused to act close to fences, trees, &c., and can cut grass of any height.

I do not limit myself, however, to the use of the described improvements in a lawn-mower, but may adapt the essential features of the device to a mowing-machine operated by horse-power without departing from the spirit of the invention, as also to hand mowing-machines for mowing in fields.

I claim—

1. The combination of the single internally-toothed driving-wheel, the yoke or frame b, having rearwardly-extending arms b' b' mounted on the shaft of said wheel at opposite sides thereof, the shoes d' d', pivoted to the forward portions of said frame and provided with seats or guides on their upper sides, a rigid bar d, whereby said shoes are rigidly connected, the superposed cutter-bars having longitudinal slots, one of said bars bearing on the seats or guides of the shoes, studs p, affixed to the shoes and passing through the slots of the cutter-bars to guide the latter, and connecting mechanism between said cutter-bars and the driving-wheel, whereby the cutter-bars are simultaneously reciprocated, as set forth.

2. The combination of the single driving-wheel having an internal gear, the yoke or frame b, having the rearwardly-extending arms b' b' mounted on the shaft of said wheel, the shoes d' d', pivoted to the frame b, the rigid bar d, connecting said shoes, the cutter-bars supported by said shoes, a slide movable in a guide in the frame b at right angles with the cutter-bars, connections between said slide and the internal gear of the driving-wheel, whereby the slide is reciprocated, and the toggle-links, both of which are pivoted to the reciprocating slide, one of said links being also pivoted to the upper and the other to the lower cutter-bar, whereby the cutter-bars are moved simultaneously in opposite directions, as set forth.

3. The combination of the carrying frame, the connected shoes pivoted to said frame, the two movable cutter-bars supported by said shoes, the lugs k k, pivoted to ears on the said bars, the toggle-links pivoted to said lugs, the slide m, movable in guides on the supporting-frame at right angles with the cutter-bars, and means for reciprocating said slide, whereby the latter is caused to reciprocate the cutter-bars simultaneously, as set forth.

4. The combination of the driving-wheel having an internal gear, the forwardly-projecting frame mounted on the shaft of said wheel, the cutter-bars propelled by said frame, a crank-shaft journaled in bearings on the said frame and provided with a pinion meshing with the internal gear of the driving-wheel, a slide fitted to reciprocate in guides on the frame at right angles with the cutter-bars and provided with a slot which receives the wrist-pin of the crank, and connections between said slide and the cutter-bars, whereby the latter are reciprocated simultaneously by the movements of the slide, as set forth.

In testimony whereof I have signed my name to this specification, in the presence of two subscribing witnesses, this 5th day of December, A. D. 1889.

CHARLES E. HOLMES.

Witnesses:
HOMER BROOKS,
ACHSA E. TRASK.